United States Patent Office 3,334,150
Patented Aug. 1, 1967

3,334,150
HYDROFLUORINATION OF BROMINATED BENZENE, DIPHENYL, TRIPHENYL AND DERIVATIVES THEREOF
Ogden R. Pierce, George A. Grindahl, and Lorne A. Loree, Midland, Mich., assignors to Dow Corning Corporation, Midland, Mich., a corporation of Michigan
No Drawing. Filed Sept. 14, 1964, Ser. No. 396,391
4 Claims. (Cl. 260—650)

This application is a continuation-in-part of application Ser. No. 389,465, filed Aug. 13, 1964, now abandoned.

This invention relates to bromine-fluorine substituted aromatic compounds that contain hydrogen, and a process for making them.

The compounds of this invention are useful as chemical intermediates, fireproofing agents, polymer ingredients, etc. They are made by the process of hydrofluorinating (a) a compound of the formula

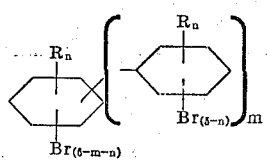

where R is a lower perfluoroalkyl radical, $m$ is an integer of 0 through 2, and each $n$ is an integer of 0 through 2, comprising contacting the above compound with a mixture of (b) an alkali metal fluoride with a formula weight that is higher than that of sodium fluoride, and (c) a hydrogen-containing polar solvent or mixture of solvents chosen from the class of organic materials which are liquid at the reaction temperature, and which display a dielectric constant of greater than 20 when measured at 20° C., there being no substantial amount of active hydrogen present in the solvent, at least one hydrogen atom and one fluorine atom being incorporated into each molecule of product, and at least one bromine atom remaining in each molecule of product.

The word "product" as used above, is not intended to include byproducts. The process of this invention often gives less than a 70% yield of bromohydrofluorinated products, the byproducts being bromofluorinated materials, etc.

By "active hydrogen" it is meant any hydrogen atom which is bonded to oxygen, sulfur, nitrogen or phosphorus atoms, or any other hydrogen atom of equal or greater acidity than a hydrogen atom bonded to any of the above four elements. Such a polar solvent as water is therefore not suitable in this invention, as it possesses a substantial amount of active hydrogen.

R can be any lower perfluoroalkyl radical such as trifluoromethyl, pentafluoroethyl, heptafluoropropyl, perfluorotertiarybutyl, perfluorohexyl, perfluorooctyl, etc.

The process of this invention operates to replace bromine atoms of the original reactant with fluorine and hydrogen atoms, the source of the hydrogen atoms apparently being the solvent used in the process.

The products of this process can be generally described as

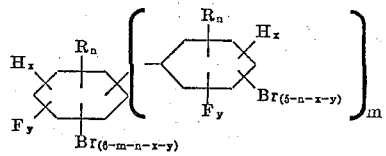

where each $x$ is usually an integer of 0 through 2, but can have a value of up to 4, $y$ is an integer of 0 through 5, and the other symbols are as defined above. However, each molecule of product must contain fluorine, bromine, and hydrogen, each bonded to an aromatic carbon atom. Otherwise, it is a byproduct.

A large number of products are made by the process of this invention; for example, when the reactant is hexabromobenzene, the following, among others, can be products:

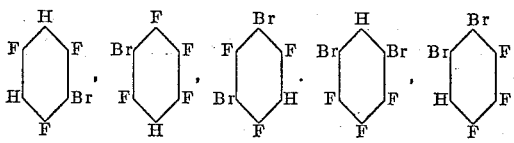

Bromofluorinated byproducts such as

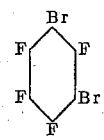

are also produced.

When other reactants, such as "R" substituted and polycyclic reactants, are used in the process of this invention, the same broad spectrum of products can be found.

In general, the number of hydrogen atoms that are found in the product molecules will not exceed two hydrogen atoms per ring in the molecule. In other words, whereas a substituted benzene product will generally possess no more than two hydrogen atoms, a substituted biphenyl product is likely to have up to four hydrogen atoms, etc.

If more hydrogen is desired in the product, a very small amount of a polar solvent which possesses active hydrogen (defined above) should be added to the reaction mixture. This will cause more hydrogen to be found in the product. In fact, if an excess of active hydrogen-containing solvent is used, the product may be fully hydrogenated, the only halogen in the product being the halogens in the R groups. It is for this reason that active hydrogen-containing solvents are generally undesirable; highly hydrogenated fluorobromo aromatic compounds are usually preparable by other methods.

If less hydrogen is desired in the product (i.e., approximately 1 hydrogen substituent per molecule), there can be added to the reaction mixture a catalytic amount (e.g., from 0.01 to 100 weight percent, based on the weight of the reaction mixture) of a compound selected from the group consisting of sodium chloride, potassium chloride, lithium chloride, and the fluorides, chlorides, and bromides of the elements of Groups III–A, I–B, and VIII. Examples of these latter materials are $FeCl_3$, $CoBr_2$, $AgCl_2$, $PtCl_2$, $OsBr_3$, $RhF_3$, $PdCl_2$, $FeF_3$, $FeBr_2$, $FeBr_3$, $CuBr$, $AlCl_3$, $BF_3$, $TlCl_3$, and $NiCl_3$.

The above salts serve to hinder the hydrogenation of the haloaromatic compounds of this invention, so that the yield of monohydrogenated species is increased at the expense of higher hydrogenated species.

Suitable solvents for the process of this invention are, as said above, inert solvents with a dielectric constant of over 20, and no substantial amount of active hydrogen. By "substantial amount" it is meant that amount of active hydrogen that causes the reactant to become essentially dehalogenated but for the halogens on the R groups so that the products of this invention are not produced. It is believed that the active hydrogen atoms replace the halogens on the aromatic rings with great ease, so that one mole of active hydrogen will replace close to one mole of halogen. Thus the mole relationship would seem to be useful in determining what a "substantial amount" is in any given case. Examples of suitable solvents are N-methyl-2-pyrrolidone, N,N-dimethylformamide, dimethylsulfone, dimethyl sulfoxide, tetramethylene sulfone, N,N'- dimethylethylene urea, hexamethylphosphoramide and pyridine oxide.

The process of this application generally runs well in a range of 100° C. to 275° C. The preferred range is from 150° C. to the decomposition temperature or the boiling point of the solvent. Temperature is not critical.

It is often desirable to run the reaction in a bomb, to raise the boiling point of the solvent by means of pressure.

Potassium fluoride is the most commonly used alkali metal fluoride in this process, because it is readily available and inexpensive.

The proportions of ingredients in this process are not critical. There must certainly be sufficient alkali metal fluoride to provide an adequate supply of fluorine, and there must be sufficient solvent so that the reaction mixture possesses fluid properties, and also so that there is an adequate source of hydrogen. Beyond this, however, there is no limit on the reactant and solvent proportions.

Reaction time likewise is not critical.

The following examples are illustrative only and should not be construed as limiting the invention which is properly delineated in the appended claims.

*Example 1*

732 grams of hexabromobenzene, 634 grams of potassium fluoride, and 1700 ml. of N,N-dimethylformamide was heated at 205° C. for 16 hours. The mixture was then steam-distilled, and the liquid portion of the residue (186 grams) was fractionated.

A large quantity of the residue boiled over at 85–90° C. under 20 mm. pressure. This portion of the residue was found to contain by weight percent 25.56% carbon, 51.3% bromine, 19.1% fluorine, and 0.5% hydrogen. Nuclear magnetic resonance and infrared studies showed

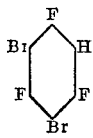

to be present.

*Example 2*

500 ml. of tetramethylene sulfone was added to a three-necked round-bottom flask fitted with a thermowell, stirrer, reflux condenser, and heating mantle. 92 grams of hexabromobenzene was added to the solvent, with stirring, along with 116 grams of KF. The contents of the flask were heated with stirring at 225° C. for 3 hours. After cooling, the contents of the flask were steam distilled for one hour.

The product was fractionated, and gave the following product distribution:

Monobromo materials—28 weight percent of the total
 .2,4,6-trifluoro-3 bromobenzene—69 mol percent
 .1,2,3,5-tetrafluoro-6 bromobenzene—31 mol percent
Dibromo materials—45 weight percent of the total
 .2,4,6-trifluoro-1,5-dibromobenzene—68 mol percent
 .3,4,5,6-tetrafluoro-1,2-dibromobenzene—3 mol percent
 .2,4,5,6-tetrafluoro-1,3-dibromobenzene—12 mol percent
 .2,3,5,6-tetrafluoro-1,4-dibromobenzene—<1 mol percent
 .2,3,4-trifluoro-1,6-dibromobenzene—12 mol percent
 .3,4,5-trifluoro-2,6-dibromobenzene—5 mol percent
Tribromo materials—27 weight percent of the total
 .1,3,5-trifluoro-2,4,6-tribromobenzene—100 mol percent
Trace amounts of other species were also present.

*Example 3*

When 100 grams of trifluoromethyl pentabromobenzene are reacted with 100 grams of cesium fluoride and 200 grams of N-methyl-2-pyrrolidone at a temperature of 150° C., several varieties of trifluoromethyl hydrobromofluorobenzene are produced.

*Example 4*

When 100 grams of trifluoromethyl perfluorooctyltetrabromobenzene are reacted with 100 grams of rubidium fluoride and 200 grams of dimethyl sulfone at a temperature of 200° C., several varieties of trifluoromethyl perfluorooctyl hydrobromofluorobenzene are produced.

*Example 5*

When 100 grams of decabromobiphenyl are reacted with 50 grams of potassium fluoride, 10 grams of NaCl, and 150 grams of N,N'-dimethylethylene urea in a bomb at a temperature of 150° C., several varieties of hydrobromofluorobiphenyl are produced, a large amount of the material so produced containing one hydrogen atom per molecule.

*Example 6*

When 10 grams of

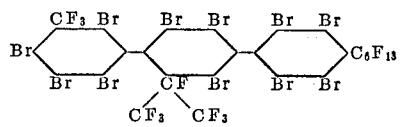

are reacted with 10 grams of potassium fluoride and 150 grams of pyridine oxide in a bomb at a temperature of 150° C., some of the bromine atoms above are replaced by hydrogen and fluorine, yielding several hydrobromofluoro derivatives of the above compound.

*Example 7*

The experiment of Example 2 was repeated with 18.8 grams of FeCl₃ added. A substantial yield of bromohydrofluorinated benzenes was recovered, which contained roughly one-half of the hydrogen contained in the product of Example 2.

The product was fractionated to yield the following monobrominated materials: 18.3 mol percent of 2,4,6-trifluoro-3-bromobenzene; 81.7 mol percent of 1,2,3,5-tetrafluoro-6-bromobenzene, based on the mols of monobromo materials present.

That which is claimed is:
1. The process of hydrofluorinating
  (a) a compound of the formula

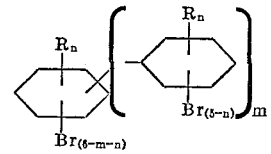

where
 R is a lower perfluoroalkyl radical,
 $m$ is an integer of 0 through 2, and each
 $n$ is an integer of 0 through 2,
comprising contacting the above compound at temperature from 100° C. to 275° C. with a mixture of
  (b) an alkali metal fluoride with a formula weight that is higher than that of sodium fluoride, and
  (c) a hydrogen-containing polar solvent with a dielectric constant of over 20, measured at at least 20° C., there being no substantial amount of active hydrogen present in the solvent; at least one hydrogen atom and one fluorine atom being incorporated into each molecule of product, and at least one bromine atom remaining in each molecule of product.
2. The method of claim 1 wherein the alkali metal fluoride is KF.

3. The method of claim 1 where (a) is hexabromobenzene.

4. The process of claim 1, during which process there is present a catalytic amount of a compound selected from the group consisting of sodium chloride, potassium chloride, lithium fluoride, and the fluorides, chlorides, and bromides of the elements of Groups III–A, I–B, and VIII.

References Cited

FOREIGN PATENTS 826,619  1/1960  Great Britain.

OTHER REFERENCES

Finger et al.: Abstract, Org. Chem. Div., XVI International Congress of Pure and Applied Chemistry, Paris, July 1957.

Finger et al.: Chemical Abstracts, vol. 45, p. 7035g (1951).

Fenton et al.: Chemical Abstracts, vol. 62, p. 2787c (1965).

LEON ZITVER, *Primary Examiner.*

H. T. MARS, N. J. KING, *Assistant Examiners.*